July 7, 1936.  H. F. UMSTOTT  2,046,710
DRIP PERCOLATOR
Filed Dec. 9, 1932
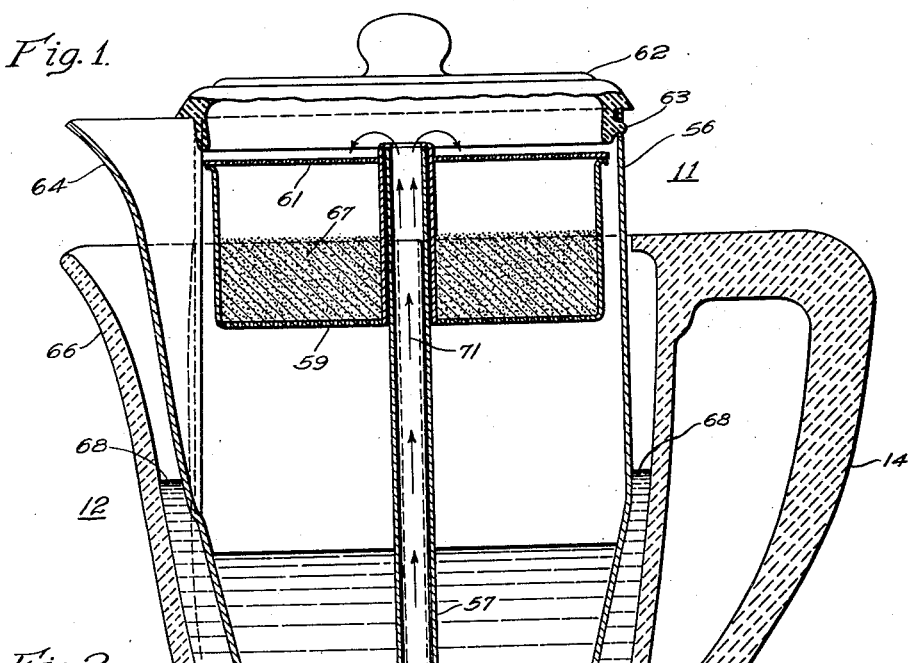
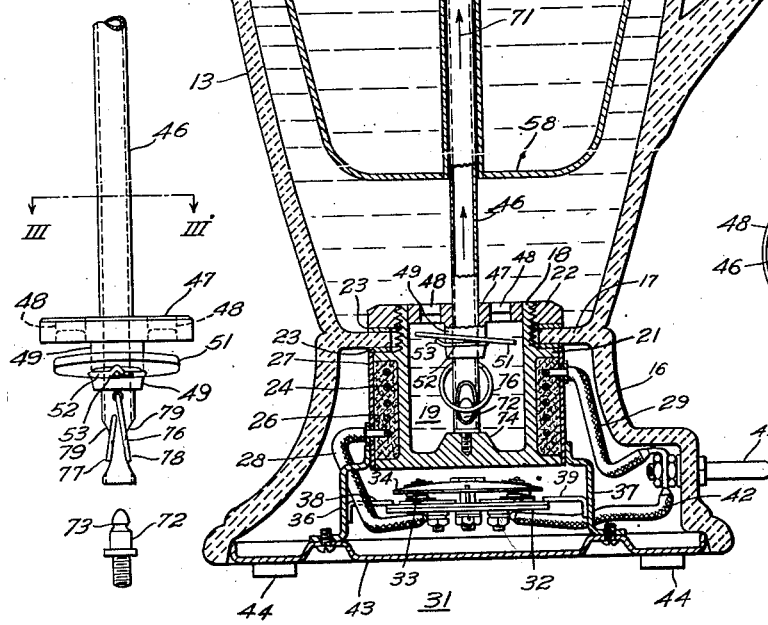
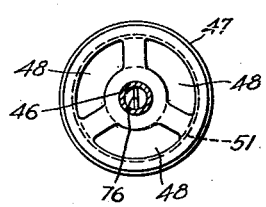
WITNESSES:
C. J. Weller.
H. M. Biebel.
INVENTOR
Harold F. Umstott.
BY W. R. Coley
ATTORNEY Patented July 7, 1936

2,046,710

UNITED STATES PATENT OFFICE 2,046,710

DRIP PERCOLATOR

Harold F. Umstott, Mansfield, Ohio, assignor to Westinghouse Electric & Manufacturing Company, East Pittsburgh, Pa., a corporation of Pennsylvania Application December 9, 1932, Serial No. 646,373

5 Claims. (Cl. 53—3)

My invention relates to infusion-making devices and particularly to percolators.

An object of my invention is to provide an infusion-making device that shall be relatively simple and consists of a minimum number of parts.

Another object of my invention is to provide an infusion-making device in which the water passes but once through the infusion material.

Another object of my invention is to provide a percolator for making drip coffee, having a relatively few parts and in which substantially the entire capacity of the container can be utilized.

Another object of my invention is to provide an infusion-making device having a valve means for effecting circulation of the water until it reaches a certain temperature and for then causing it to pass through the infusion material.

Another object of my invention is to provide a percolator including a pair of nesting containers, and a valve means for causing the water in the outer container to be heated to a certain temperature before it passes through the infusion material and into the inner container.

In practicing my invention I provide an outer container including a heating or vaporizing chamber, a discharge tube extending into the vaporizing chamber and having a valve means thereon of the clapper type, an inner container aligned by and slidably mounted on the discharge tube and a material containing basket supported in the inner container.

In the single sheet of drawings:

Figure 1 is a view mainly in vertical section of a device embodying my invention, Fig. 2 is a fragmentary side elevational view illustrating the lower part of a discharge tube and a holding ring, and Fig. 3 is a sectional view taken on the line III—III of Fig. 2.

An infusing-making device which is designated, generally, by the numeral 11 is shown more particularly in the form of a percolator or as it may be called a drip percolator. I desire it to be understood that while the word percolator is used in the specification and claims, my invention is not to be limited to an appliance for making or brewing coffee only but that such term is used in a generic sense as covering infusion-making devices in general.

The percolator 11 comprises an outer container 12 which may be of the usual pot type, and includes a body portion 13, a handle 14 thereon and a base portion 16. While I have indicated a unitary structure of this outer container 13 and the hollow base 16, I do not desire to be limited thereto nor do I desire to be limited to the use of a refractory material for making this outer container.

An opening is provided in the bottom wall 17 of the body portion and a suitable tubular metal member 18 is located therein, which member is closed at the bottom and open at the top to provide a vaporizing chamber 19 of the kind used in many designs of percolators. A flange 21 extends radially of the tubular member 18 intermediate its ends and is adapted to be located below the wall 17 and a lock nut 22 having screw threaded engagement with the upper portion of member 18 is located above wall 17 in order to securely clamp the member 18 in its proper operative position substantially as shown in Fig. 1 of the drawing. Annular gaskets 23 may be provided in a manner well known in the art to insure that a water-tight joint shall be provided.

An electric heating means 24 is illustrated schematically only as including a resistor wire surrounding the tubular member 18 and embedded in a suitable electric-insulating and heat-conducting material or cement. A cover 27, which may be of sheet metal, surrounds the embedded heating element, which is provided with terminal leads 28 and 29. While I have illustrated a specific embodiment of a heating unit, I do not desire to be limited thereto as the heating element itself constitutes no part of my present invention.

A thermally actuable switch 31 is suitably supported immediately below the lower enclosed end of tubular member 18 and is connected in series-circuit with the heating element. The switch 31 includes a base 32, fixed contact members 33 thereon and a snap-acting bi-metallic disc 34 provided with contact bridging members. The bi-metallic disc may be of the type disclosed and claimed in Patent No. 1,448,240 to John A. Spencer. Any suitable means for supporting the thermostat switch 31 in substantially the position shown in the drawing may be utilized and as shown in Fig. 1 of the drawing, I may provide depending bars 36 and 37 from which the switch assembly 31 may be supported by inwardly extending metal lugs 38 and 39.

A pair of terminal pins 41, only one of which is shown in the drawing, extend through one portion of the wall of the base 16 and may be held therein by suitable nuts and washers. The terminal lead 29 is connected to one of the terminal pins 41, while lead 28 is connected to one terminal of the switch 31, the other terminal of the switch being connected by a conductor 42 to the other terminal pin 41. A bottom closure 43 is secured against the bottom of members 36 and 37 and may be provided with knobs 44 to raise the bottom slightly above a supporting surface on which the percolator may be located.

A discharge tube 46 has its lower end extending into the vaporizing chamber 19. A valve structure is fixedly mounted on the tube 46 above its lower end and includes a valve body 47 provided with a plurality of openings 48 therein. The valve body 47 has a depending integral portion 49 on which is loosely mounted a clapper-valve disc 51. The disc 51 is prevented from dropping off the extension 49 by a spring ring 52 which has one portion thereof bent outwardly and upwardly as indicated at 53 in Figs. 1 and 2 of the drawing. This has the result that the valve disc 51 will be located in a slightly tilted position relatively to the bottom surface of the valve body 47, and I have found that the action which I wish to obtain, and which will be hereinafter described in detail, is obtained when this angle of tilt is on the order of 7° from the horizontal. The valve plate 51 has a large clearance from the inner surface of the wall of vaporizing chamber 19. It is obvious that the disc 51 could also be supported in other ways.

An inner container 56, which may be made of metal, is located within the outer container 13 and the general contour and shape of the two containers is substantially the same. The inner container 56 is provided with an upstanding tube 57 suitably secured to the bottom wall 58 thereof, the tube 57 being slidable on the percolating tube 46. A material containing basket 59 having a cover 61 is located on the top of tube 57 and the basket 59 and cover 61 are suitably perforated to permit of water or other fluid flowing therethrough. A cover 62 has an interlocking connection as shown at 63 with the top portion of the wall of the container 56, which container is further provided with a spout 64 which is adapted to interfit with a spout portion 66 of outer container 13.

If it be assumed that an operator wishes to make an infusion or other beverage, such as coffee, a suitable amount of ground coffee 67 is placed in the basket 59 and a suitable quantity of water is poured into the outer container, the water level thereof being indicated by the lines 68 in Fig. 1 of the drawing. It is to be understood, of course, that the inner container 56 will float in and substantially on the water in the outer container so that the level thereof may be different than that indicated by the lines 68. If now, the heating unit is energized in the usual manner as by the use of a plug and cord, the water in the vaporizing chamber 19 will be heated by reason of the energy translated into heat in the resistor wire 24. Within a short time globules or drops of vapor or steam are formed in the vaporizing chamber which will tend to rise and may strike the bottom surface of plate 51. It will be noticed that the clearance between the outer periphery of disc 51 and the inner wall of the vaporizing chamber is relatively large and I have found that a radial clearance of 7/64 inch will give good results. It is further to be noted that the disc 51 is located a relatively large distance below the lower surface of the valve body 47 whereby relatively large openings are provided for the circulating water. I have found by actual tests of a device of substantially the kind shown in Fig. 1 of the drawing that the globules of vapor will not continue to adhere to the bottom surface of disc 51 but that they will move toward the higher part of the disc and on past the highest point of the edge and through one of the openings 48 thereby tending to establish a definite path of circulation for the water in the container 13.

This action continues until a predetermined temperature is reached in the volume of water in the outer container or in other words until substantially all of the water in the outer container has been heated by pure circulating action to a predetermined temperature.

When the temperature of substantially all of the water in the outer container has reached a value which is on the order of say 160° or slightly over, vaporization of the water in the vaporizing chamber will occur more frequently or more violently and the vapor or steam generated thereby will be sufficient to force the disc 51 upwardly against the bottom surface of the valve body 47 thereby closing the valve and causing a small quantity of water at a time to flow into and upwardly through the discharge tube 46 as indicated by the arrows 71. This action will continue until substantially all of the hot water in the outer container has been pumped through the discharge tube 46 through the infusion material 67 in the basket 59 and into the inner container 56 which is, of course, fluid-tight, where it will be retained until required for use.

It is obvious that the inner container 56 will float in the water initially and I provide means of a resilient type for holding the discharge tube and the valve thereon in their proper operative positions relative to the vaporizing chamber 19. Thus, I provide a pin 72 having a peripheral groove 73 at its upper end, which pin has screw threaded engagement with a projection 74 in the bottom wall of member 18. A spring ring clip 76 has a part thereof extending through the tube 46 and has integral portions 77 and 78 located in recesses 79 in the tube 46, so that the portions 77 and 78 may have a part thereof located in the groove 73. This construction provides a yielding holding or locking means whereby the discharge tube and the valve thereon are held in proper operative position as shown in the drawing, but from which position they can easily and quickly be released by a quick pull.

If it should happen that a small part of water initially placed in container 13 should remain therein, the heating element will remain energized until substantially all of this water has been vaporized, when the thermostatic switch 31 will operate by reason of its being overheated upon the well in member 18 running dry, so that the supply of energy to the heating unit is interrupted.

It may be noted that the device embodying my invention provides an infusion-making appliance in which it is possible to utilize substantially the full capacity of either one of the two nested containers whereby a great increase in capacity of a device of this kind is attained. The device embodying my invention utilizes a relatively small number of parts and in particular it utilizes a relatively simple form of clapper-valve which is effective to cause the water to flow in two separate paths in accordance with the change of temperature thereof. That is, the water circulates in the outer container and through the valve, which remains open or normally inoperative, as long as the water temperature is below a predetermined value, the valve causing the water to flow in a different path when a certain temperature of the water has been reached. The first path in which the relatively cool water flows is extraneous to the discharge tube, but the second path is through the discharge tube and it will be evident from the description given above that the infusion material is subjected only to the action of hot water and that any quantity of water passes through the infusion material only once.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A percolator comprising a water-heating chamber, a discharge tube having one end located in said chamber, a headed pin in the chamber and resilient means on the discharge tube engaging the headed pin.

2. An infusion making device comprising an outer container for initially receiving a fluid, heating means for the fluid, an inner container for receiving the infusion, movable in the outer container and having a guide tube extending therethrough, a discharge tube operatively connecting the two containers and extending through the guide tube, a clapper valve on the discharge tube adjacent one end thereof and in the outer container, a headed pin operatively associated with the outer container, and resilient means operatively associated with the tube and cooperating with the headed pin to hold the tube and valve in their proper operative positions relatively to the outer container.

3. An infusion making device comprising an outer container for initially holding a fluid, a water heating chamber at its lower end, a discharge tube in its lower end located in the water heating chamber, a clapper valve structure on the discharge tube in the water heating chamber, an inner container for receiving the infusion slidable vertically on the discharge tube and floatable in the fluid, and cooperating means including a headed pin in the chamber and a spring ring clip on the tube for holding the tube and valve structure in their proper operative positions against the upward frictional force of the floating inner container.

4. A device as set forth in claim 18 in which the valve structure includes a perforated valve body fitting within the chamber and a clapper valve plate supported by the valve body at an angle relatively to the bottom surface of the valve body and at a relatively large distance therebelow and having an external diameter that is appreciably smaller than the water heating chamber to cause circulation of the fluid from the outer container through the valve structure and the water heating chamber as long as the temperature of the fluid is below a certain value and to cause the fluid to traverse the discharge tube when said temperature is above said value.

5. A percolator comprising a container for a substance capable of existing in a fluid state, said container being provided with an upper chamber and a lower chamber, a plate interposed between said chambers, provided with openings therein for permitting said substance to flow between said chambers under the action of gravity, means for discharging said substance in said lower chamber, means for heating said substance in said lower chamber and a disc so mounted that normally it is substantially displaced from said openings and oriented at an oblique angle to the surface of said substance in said upper chamber thereby permitting said substance to circulate between said chambers and when the temperature of said substance in said lower chamber attains a predetermined value, said disc, under the pressure of said substance, engages said plate closing said openings and interrupting the flow of said substance between said openings thereby rendering said discharging means operative.

HAROLD F. UMSTOTT.